US012783561B2

(12) United States Patent
Brenner et al.

(10) Patent No.: US 12,783,561 B2
(45) Date of Patent: Nov. 3, 2026

(54) GENERATIVE ARTIFICIAL INTELLIGENCE FRAMEWORK WITH SPECIALIZATION VIA SIMULATED HISTORY GENERATION

(71) Applicant: Insight Direct USA, Inc., Chandler, AZ (US)

(72) Inventors: David Brenner, Tucumcari, NM (US); David McCurdy, Chandler, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 19/044,212

(22) Filed: Feb. 3, 2025

(65) Prior Publication Data

US 2025/0252126 A1 Aug. 7, 2025

Related U.S. Application Data

(60) Provisional application No. 63/549,018, filed on Feb. 2, 2024.

(51) Int. Cl.

| | |
|---|---|
| ***G06F 16/00*** | (2019.01) |
| ***G06F 16/3329*** | (2025.01) |
| ***G06F 40/30*** | (2020.01) |
| ***H04L 51/02*** | (2022.01) |

(52) U.S. Cl.
CPC ........ *G06F 16/33295* (2025.01); *G06F 40/30* (2020.01); *H04L 51/02* (2013.01)

(58) Field of Classification Search
CPC .................................................. G06F 16/33295
See application file for complete search history.

(56) References Cited

U.S. PATENT DOCUMENTS 11,676,044 B1 * 6/2023 Mazza .................. G06N 5/043 706/11
11,960,514 B1 * 4/2024 Taylert ................ G06F 16/3329
12,182,149 B1 * 12/2024 Krishna ................ G06F 16/248
12,231,380 B1 * 2/2025 Rodgers .................. G06F 40/30
(Continued)

FOREIGN PATENT DOCUMENTS

WO 2023022727 A1 2/2023

OTHER PUBLICATIONS

Arize.com “Mastering the OpenAI API: Tips and Tricks,” https://arize.com/blog-course/mastering-openai-api-tips-and-tricks/ (published Aug. 18, 2023).
(Continued)

*Primary Examiner* — Noosha Arjomandi
(74) *Attorney, Agent, or Firm* — Kinney & Lange, P.A.

(57) ABSTRACT

A method of interacting with a large language model to elicit a semantic feature of interest from a document under review includes electronically inputting, in an application program interface of a chat application, a first prompt assigned to a user, the first prompt yielding a plurality of possible responses from the language model based on content of the document under review; generating an example set comprising text from example documents representative of each of the plurality of possible responses; and electronically inputting, before the first prompt in an application program interface of a chat application, a fabricated history of a conversation between the user and the language model. The fabricated history includes the example set and a plurality of possible responses assigned to the language model.

20 Claims, 4 Drawing Sheets

(56) References Cited

U.S. PATENT DOCUMENTS

| | | | | |
|---|---|---|---|---|
| 12,505,136 | B2 * | 12/2025 | Khosla | G06F 16/3344 |
| 12,517,954 | B1 * | 1/2026 | Trown | G06F 16/90335 |
| 2010/0153318 | A1 * | 6/2010 | Branavan | G06F 40/169 706/46 |
| 2021/0406260 | A1 * | 12/2021 | Sharifi | G06F 16/2428 |
| 2022/0382975 | A1 * | 12/2022 | Gu | G06N 3/0895 |
| 2023/0066796 | A1 * | 3/2023 | Khlystik | G06F 40/30 |
| 2023/0083512 | A1 | 3/2023 | Newman et al. | |
| 2023/0244938 | A1 | 8/2023 | Wei et al. | |
| 2023/0274086 | A1 | 8/2023 | Tunstall-Pedoe et al. | |
| 2023/0297887 | A1 * | 9/2023 | Gurgu | G06N 20/00 706/12 |
| 2024/0412720 | A1 * | 12/2024 | Vasylyev | G06F 16/90332 |
| 2025/0013437 | A1 * | 1/2025 | Vidan | G06F 8/33 |
| 2025/0117595 | A1 * | 4/2025 | Taheri | G06F 40/40 |
| 2025/0124001 | A1 * | 4/2025 | Everest | G06F 16/16 |
| 2025/0139168 | A1 * | 5/2025 | Hsu | G06F 16/90332 |
| 2025/0209297 | A1 * | 6/2025 | Reid | G06N 3/006 |
| 2025/0210033 | A1 * | 6/2025 | Sharifi | G06F 16/33295 |
| 2025/0217576 | A1 * | 7/2025 | Mann | G06F 16/33295 |
| 2025/0238347 | A1 * | 7/2025 | Sateli | G06F 9/451 |
| 2025/0245423 | A1 * | 7/2025 | Agarwal | G06F 40/205 |
| 2025/0252126 | A1 * | 8/2025 | Brenner | H04L 51/02 |
| 2025/0265413 | A1 * | 8/2025 | Hernandez | G06F 40/284 |
| 2025/0272279 | A1 * | 8/2025 | Kshirsagar | G06F 16/2428 |
| 2025/0272305 | A1 * | 8/2025 | Kshirsagar | G06F 16/252 |
| 2025/0272319 | A1 * | 8/2025 | Shimizu | G06F 16/33295 |
| 2025/0322273 | A1 * | 10/2025 | Voonna | G06N 20/00 |
| 2025/0371041 | A1 * | 12/2025 | Yang | G06F 16/243 |

OTHER PUBLICATIONS

OpenAI, “Best practices for prompt engineering with OpenAI API,” https://help.openai.com/en/articles/6654000-best-practices-for-prompt-engineering-with-openai-api.

OpenAI, “ChatGPT API Transition Guide,” https://help.openai.com/en/articles/7042661-chatgpt-api-transition-guide.

* cited by examiner

GENERATIVE ARTIFICIAL INTELLIGENCE FRAMEWORK WITH SPECIALIZATION VIA SIMULATED HISTORY GENERATION

CROSS-REFERENCE TO RELATED APPLICATION

This application is a nonprovisional application claiming the benefit of U.S. provisional application Ser. No. 63/549,018, filed on Feb. 2, 2024, and entitled "GENERATIVE ARTIFICIAL INTELLIGENCE FRAMEWORK WITH SPECIALIZATION VIA SIMULATED HISTORY GENERATION" by David Brenner.

FIELD OF THE INVENTION

The present disclosure relates generally to generative artificial intelligence (AI) systems and methods and, more particularly, to a method of interacting with a pre-trained large language model (LLM) and/or transformer model.

BACKGROUND

Generative artificial intelligence (AI) language models, such as large language models (LLMs) and/or transformer models, are capable of dynamically generating content based on user prompts. The accuracy or acceptability of the generated content or response from the generative AI model often depends on the content of the user prompt.

SUMMARY

In one aspect, a method of interacting with a large language model to elicit a semantic feature of interest from a document under review includes electronically inputting, in an application program interface of a chat application, a first prompt assigned to a user, the first prompt yielding a plurality of possible responses from the language model based on content of the document under review; generating an example set comprising text from example documents representative of each of the plurality of possible responses; and electronically inputting, before the first prompt in an application program interface of a chat application, a fabricated history of a conversation between the user and the language model. The fabricated history includes the example set and a plurality of possible responses assigned to the language model.

In another aspect, a method of interacting with a large language model to extract a semantic feature of interest from a document includes transmitting, to the language model, a fabricated history of a conversation between a user and the language model. The fabricated history includes a first prompt assigned to a user, content of the first prompt comprising text from a first document and a first query directed to identifying the semantic feature of interest in the first document; a first response assigned to the language model, content of the first response responsive to the first query; a second prompt assigned to the user, content of the second prompt comprising text from a second document and a second query directed to identifying the semantic feature of interest in the second document; and a second response assigned to the language model, content of the second response responsive to the second query. The first and second queries are the same and the content of the first response differs from content of the second response. The method also includes transmitting, to the language model, a third prompt assigned to the user, and receiving, from the language model, a third response to the third query. The content of the third prompt comprising includes text from a third document and a third query directed to identifying the semantic feature of interest in the third document. The third query is the same as the first and second queries.

The present summary is provided only by way of example, and not limitation. Other aspects of the present disclosure will be appreciated in view of the entirety of the present disclosure, including the entire text, claims and accompanying figures.

Figure 1:
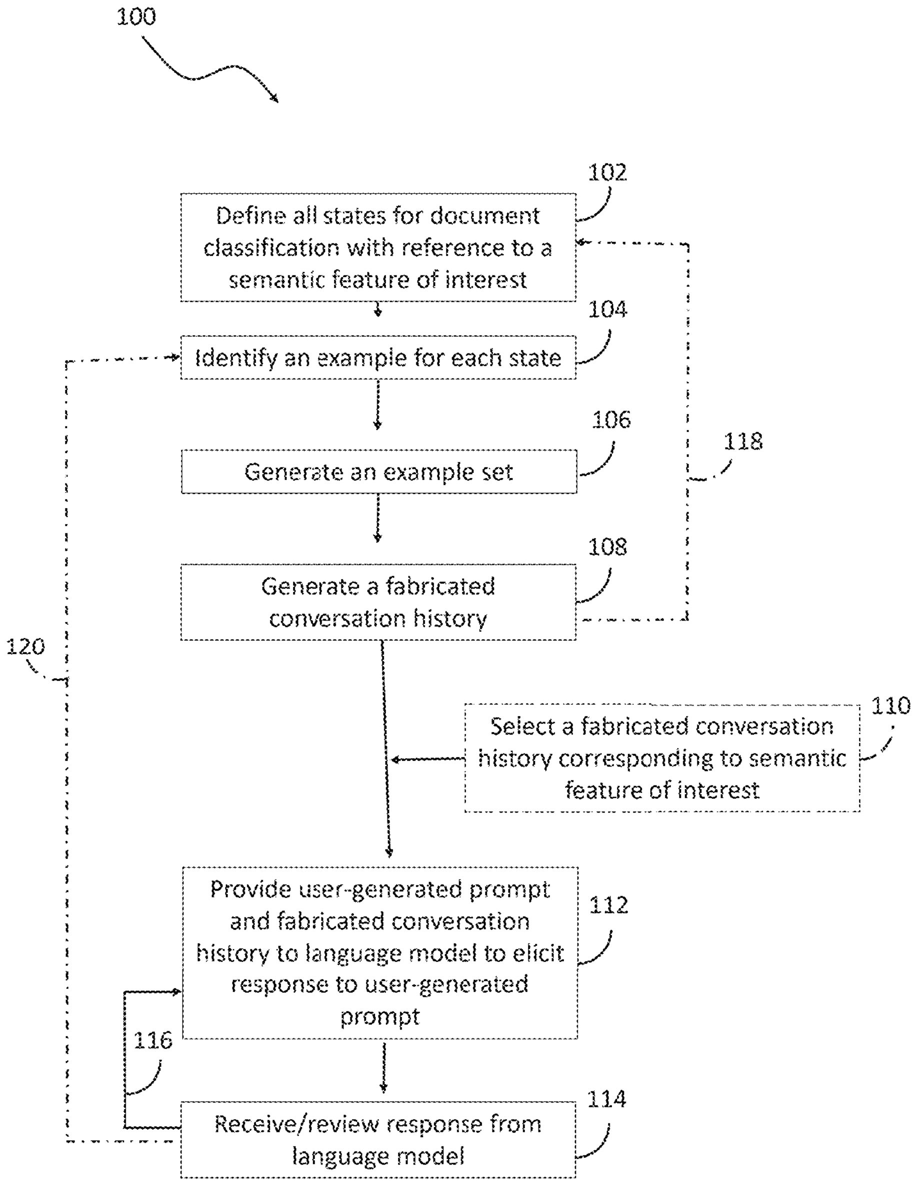
FIG. 1 is a flow diagram of an example of a method of interacting with a pre-trained language model.

While the above-identified figures set forth one or more examples of the present disclosure, other examples are also contemplated, as noted in the discussion. In all cases, this disclosure presents the invention by way of representation and not limitation. It should be understood that numerous other modifications and examples can be devised by those skilled in the art, which fall within the scope and spirit of the principles of the invention. The figures may not be drawn to scale, and applications and examples of the present invention may include features and components not specifically shown in the drawings.

DETAILED DESCRIPTION

The present disclosure relates to a method of interacting with a pre-trained generative AI language model (referred to hereinafter as "language model") to review documents. In generative AI systems, users may be able to improve the quality or accuracy of generated content or responses by providing one or more examples in the user-generated natural language prompt, which influence or guide the generative AI model. While this technique can be generally useful, it is not universally successful and can produce widely divergent results in some applications. The present disclosure provides alternative pre-prompting approaches for improved response quality when used with specialized queries. This disclosure is particularly directed to a method of interacting with a language model to evaluate documents for semantic features of interest. The disclosed method improves upon prior art prompting techniques and enables users to identify and classify documents based on semantic features contained therein and/or the presence and/or absence of a particular semantic feature of interest that may be described or defined differently in each document.

A semantic feature can be, for example and without limitation, a term or condition of a contractual agreement under review (i.e., referring to contractual rights or obligations of a party to the agreement), such as a restriction on cross-border communication or participation of non-U.S. citizens. The language (i.e., words or phrases) used to describe a semantic feature may vary widely from one document to another, and thus careful review and scrutiny is often required. This is particularly true for documents that contain complex terminology or language that requires evaluation by individuals with specialized training or knowledge (e.g., legal documents, scientific documents, etc.). Manual review of documents to identify one or more semantic features of interest can be time consuming and can also produce inaccurate results.

The disclosed method uses a fabricated conversation history with simulated roles assigned to a user and the language model and including a curated example set generated to tailor language model responses related to a semantic feature of interest from multiple documents under review. The disclosed method has been demonstrated to provide improved reliability and reduced hallucinations (i.e., nonsensical or inaccurate outputs from the language model based on perceived patterns or objects that are nonexistent or undetectable by humans) as compared to other prompting techniques. While the disclosed method may not be able to fully replace manual document review in all applications, it provides a tool to increase efficiency and accuracy of manual review.

As used herein, "fabricated conversation history" refers to user-generated content assigned to both a user and the language model in a chat application to generate a fabricated back-and-forth conversation between the user and language model. User-generated content can be provided, for example, in an application programming interface (API) providing programmatic access to the language model. In an illustrative example, fabricated conversation history can be provided via an API such as Chat Completion in OpenAI. Fabricated user prompts and fabricated language model responses influence the language model response to a subsequent user-generated prompt. As used herein, the term "user prompt" refers to content assigned to a user role in the language model and can include a query, context, instructions, and/or other content. For example, each prompt assigned to the user can include a text from a document and a query or instruction directed to identifying the semantic feature of interest in the text. A fabricated response assigned to the language model is provided for and with each user prompt. The fabricated conversation history is developed to provide examples for all possible responses to a subsequently provided user-generated prompt relating to a new document or segment of text not previously provided to the language model. Once the fabricated conversation history is developed, it can be provided as a pre-prompt to user prompts directed to the evaluation of new text segments or documents. In this manner, a user can interact with the language model to ascertain information contained in multiple documents or portions thereof not previously provided to the language model. Unique fabricated conversation histories can be generated for detection or evaluation of a myriad of semantic features.

It will be understood by one of ordinary skill in the art that while the method disclosed herein is particularly useful for evaluating a document under review for semantic features, the disclosed method can be used in a variety of applications or adapted for use in a wide variety of applications without departing from the scope of the disclosure.

FIG. 1 is a flowchart of method 100 for interacting with a pre-trained language model. The language model includes one or more computer-implemented machine learning models configured to generate natural language text data in response to a variety of inputs, including natural language inputs. The language model can be trained at least in part through semi-supervised or self-supervised learning on large quantities of human-generated text. The language model can be, for example, a deep learning model or transformer-based deep neural network such as a Generative Pre-trained Transformer (GPT) model.

Method 100 has been developed for use with a generalized large language model (LLM), such as ChatGPT, capable of providing general-purpose language understanding and generation. In some applications, it may be preferable to use method 100 with a specialized or fine-tuned large language model, however, use with a specialized or fine-tuned large language model may not be necessary to produce accurate and reliable results. For the examples disclosed herein, no additional training of the language model is required for document evaluation for semantic features of interest.

Method 100 includes the steps of defining all states for document classification (step 102), providing, from document text, an example for each state (step 104), generating an example set including examples for all states (step 106), generating a fabricated conversation history from the example set (step 108), optionally, selecting a fabricated conversation history from a plurality of fabricated conversation histories (step 110), providing, to the language model, the fabricated conversation history and a user prompt relating to a new document under review to elicit a response from the language model with respect to the new document (step 112), and reviewing the response generated by the language model to classify the new document by state (step 114). Method 100 can include a testing phase and an application phase. In the testing phase, the example set provided in the fabricated conversation history can be tweaked or adjusted to reduce hallucination and improve reliability of the responses generated by the language model in response to a user prompt provided in step 112. In the application phase, the example set as presented in the fabricated conversation history remains unchanged and is applied with different user prompts in step 112. The testing phase refers to making changes to the selection or identification of examples for the example set and should not be confused with training the language model. As previously described, method 100 can be used with a generalized large language model without specialized training or fine-tuning.

Method 100 can be used to evaluate a document for semantic features of interest. Method 100 can be used to determine if one or more documents include a semantic feature of interest and/or can be used to classify documents based on a variety of semantic features of interest contained therein. It is not necessary that the semantic feature of interest be described with particular language (i.e., phrases or terminology) or that the language used is consistent between multiple documents under review.

In one non-limiting example, method 100 is used to evaluate contractual agreements for semantic features of interest. For example, method 100 can be used to determine if one or more contracts prohibits or restricts cross-border communication or participation. In this example, the semantic feature of interest is prohibition or restriction of cross-border communication or participation. This semantic feature may be described or defined with different language in each contract under review, may be described in the negative (e.g., stating that cross-border communication is not restricted), and may be absent from a contract (i.e., there is no mention of the semantic feature).

In step 102, all states for document classification are defined with reference to a specific semantic feature or set of semantic features. As used herein, the term "state" refers to a possible outcome or answer in response to the user-generated prompt provided to the language model for document review (i.e., the user prompt following the fabricated conversation history). More specifically, a finite basis of "states" defines all possible outcomes or responses from prompts directed to assessing a particular semantic feature. The state is used as a classification identifier that can be assigned to an example (e.g., document or segment of text extracted therefrom) identified in step 104 described below. In all embodiments, at least two states are defined, indicating there are two possible outcomes or answers. In the example provided above, there are two defined states, (1) positive and (2) negative, which indicate whether the semantic feature of interest is present in a document or segment of text extracted therefrom or is absent from the document or segment of text extracted therefrom, respectively. States are user-defined and are limited in content or in number only by definition of the semantic feature. The defined states may be multifold in some applications of method 100, although as described further herein, token limits associated with the language model may necessitate reducing the number of states and/or content thereof.

In step 104, one or more examples for each state are identified and labelled accordingly, i.e., with the corresponding state. Examples can be a document or one or more segments of text from a document. The identification of one or more examples for each state can be conducted manually. For example, a user may manually review multiple documents and select at least one document or segment(s) of text therefrom as representative of a first state, select at least one document or a segment(s) of text therefrom as representative of a second state, and so on until an example has been identified for all possible states. In some examples, a user may use a fine-tuned or otherwise specialized large language model to assist in the example identification and labelling process or portions thereof. Each identified example is labelled with a corresponding state. The labelled examples can be organized and stored, for example, in one or more local or remote databases, which can be queried for retrieval of one or more examples according to semantic feature and state.

The examples are used to generate the fabricated conversation history. The amount of text that can be provided in each example is often limited by a total token limit of the language model. Each language model typically has a restriction on the number of tokens the language model can process in a single interaction. Generally, inclusion of the entire document text in the examples for each state will exceed token limits of the language model. Token lengths for each example can be limited such that a total prompt length including both a user prompt and all examples provided in a fabricated conversation history pre-prompt does not exceed the language model token limit. To restrict token use, the user can identify and extract one or more segments of text from the documents identified as representative of each state to produce an example for each state. Preferably, the segments identified are relevant to or include language pertaining to the user-generated prompt and, specifically, the semantic feature of interest. This may not always be possible, particularly if the document does not include the semantic feature of interest.

For classification that includes "positive" and "negative" states ("positive" indicating the semantic feature of interest is present and "negative" indicating the semantic feature of interest is absent), the one or more segments of text extracted and labelled as "positive" include language relating to the semantic feature of interest. The segment of text extracted can generally be limited to sections of the document or text relating to the semantic feature of interest to reduce token use if limited by the language model. The one or more segments of text extracted and labelled as "negative" may or may not include language specifically related to the semantic feature of interest. In this case, the example may include larger text segments or more segments of the document.

Each example can additionally be labelled with document identifier data, including but not limited to document type, title, date, names of parties, etc. Where plausibly relevant to evaluation of a semantic feature at issue, complete document identifier data or portions thereof can be included with the corresponding example in the fabricated conversation history.

Generally, each example represents a single unique document. There may, however, be applications in which identifying multiple examples from a single document may be valuable. Importantly, all possible states (i.e., all possible outcomes or answers in response to a user prompt related to a semantic feature or features) are determined and represented by unique document examples to more effectively guide the language model in generating a response pertaining to new documents.

Continuing with the example semantic feature of interest, in step 104, at least one contract prohibiting or restricting cross-border communication or participation is identified as representative of the "positive" state and at least one contract that does not prohibit or restrict cross-border communication or participation is identified as representative of the "negative" state. Each contract is a separate example or is used to generate a separate example. The examples can be segments or sections of text extracted from the contracts. Examples of the positive state include at least a segment of text relating to the semantic feature of interest. Examples of the negative state may include, for example, a section of the contract where the semantic feature of interest is most likely to be found if the semantic feature of interest was present. Each example is labelled according to state. All examples can be labelled and stored according to semantic feature and state for retrieval in generating the fabricated conversation history.

In step 106, an example set is generated from the labelled examples produced in step 104. The example set includes at least one example for each state. The selection of examples for the example set can be determined in the testing phase, as described in further detail below. Including multiple examples for each state in the example set may improve the accuracy of results generated by method 100. However, token limits of the language model may necessitate use of fewer examples. One or more unique example sets can be generated for each semantic feature of interest and can be stored, for example, in a local or remote database accessible by the user and/or a language generation module as described further herein. Example sets can be labelled and queryable for retrieval.

In step 108, the fabricated conversation history is generated by converting an example set into natural language prompts or specially formatted natural language content for the language model. Within a language model API, roles are assigned to guide the language model's response. A user can interact with the language model by providing content, input in the form of natural language text, for each role. Commonly assigned roles include "system," "user," and "assistant." The "system" provides high-level instruction to guide the language model's behavior. The system prompt is sometimes referred to as a pre-prompt or internal prompt, as it defines roles and provides other instructions and/or constraints for language generation. The "user" presents queries or prompts (e.g., instructions or tasks) to the language model and the "assistant" provides the language model's response. The user is the entity or individual interacting with the language model. However, a user interacting with the language model through the API can electronically input and assign content for each of the system, user, and assistant roles.

The fabricated conversation history includes a back-and-forth dialogue between the user and the assistant. The fabricated conversation history can include multiple user-generated prompts input as content assigned to the user and multiple user-generated responses input as content assigned to the assistant. The fabricated conversation history is electronically input or formatted in a manner consistent with an actual conversation history with language model-generated responses to user prompts, such that the language model cannot distinguish between fabricated responses and actual language model-generated responses to a user prompt.

The content of the prompt assigned to the user includes an example from the example set and a question or instruction pertaining to the example and in reference to the semantic feature of interest. The example is text extracted from the example set. The question or instruction is user-generated. Each prompt assigned to the user is unique. Each prompt assigned to the user includes a different example from the example set. Each prompt can include the same question or instruction. The question or instruction is preferably clear, concise, and well-defined. Generally, the question or instruction includes no further context (e.g., examples). As previously discussed, the size of the prompt (e.g., word count) can be limited to reduce token use.

As previously discussed, at least two examples in the example set are representative of different states and, therefore, the fabricated conversation history will include at least two different responses. The content of the responses assigned to the assistant includes an answer to each question or response to each instruction presented in the user prompt. The responses are user generated. The response can be provided in a format defined in instructions assigned to the system as discussed further herein. As previously discussed, the size of the response (e.g., word count) can be limited to reduce token use in examples where the token use is limited by the language model. Each prompt assigned to the user is followed directly by a response assigned to the assistant.

For example, the fabricated conversation history can include electronically input natural language content provided in the API in the following order:

(1) a first prompt assigned to a user, the content of which includes a first example, such as text from a first document, and a first question or instruction pertaining to the first example and in reference to the semantic feature of interest;

(2) a first response assigned to the assistant (language model), the content of which is responsive to the first question or instruction;

(3) a second prompt assigned to the user, the content of which includes a second example, such as text from a second document, and a second question or instruction pertaining to the second example and in reference to the semantic feature of interest; and (4) a second response assigned to the assistant, the content of which is responsive to the second question and different from the first response.

As provided above, the fabricated history can include as few as two examples, provided in separate prompts assigned to the user, and as few as two responses assigned to the assistant (language model).

Continuing with the example of contract review, the first example provided in the first user prompt can include a segment of relevant text extracted from a contract identified as representative of contracts that prohibit or restrict cross-border communication or participation (i.e., representative of the positive state). The second user prompt can include a segment of text extracted from a contract identified as representative of contracts that do not prohibit or restrict cross-border communication or participation (i.e., representative of the negative state). The first and second questions provided in the first and second user prompts can be the same. For example, "Does this contract prevent any party from using people or systems outside of the United States?"

In this example, the fabricated or user-generated first and second responses assigned to the assistant (language model) can include a simple "yes" answer in response to the first question and a simple "no" answer in response to the second question. The responses can also include additional information defined in the instructions assigned to the system. For example, the responses may additionally include the title of the document and an excerpt from the example supporting the answer.

Steps 102 to 108 can be repeated to generate a plurality of unique fabricated conversation histories as illustrated by step 118. Each unique fabricated conversation history is generated from a unique example set, a unique labeling of that data set with system prompts (i.e. relating to states pertinent to the semantic feature at issue), or both. Example sets can vary according to the defined states with reference to a semantic feature of interest. Unique fabricated conversation histories can be generated for different sets of defined states with reference to the same semantic feature of interest and for a plurality of semantic features of interest. One or more unique fabricated conversation histories can be stored in a local or remote database accessible by the user and/or a language generation module as described further herein for further use with method 100 and/or with additional iterations of method 100. The fabricated conversation history can be stored as a natural-language prompt formatted, for example, for input in an API such as Chat Completion in OpenAI in subsequent steps of method 100. Stored fabricated conversation histories can be labelled according to a corresponding semantic feature of interest and/or sets of defined states with reference to the semantic feature of interest and can be retrievable via user and/or a system query as described further herein.

In step 110, a fabricated conversation history (or example set) corresponding to a semantic feature of interest can be selected from a plurality of fabricated conversation histories (or example sets) for use with a user prompt to elicit a response from the language model. A selected example set can be converted to a fabricated conversation history as described above. The fabricated conversation history serves as a pre-prompt to the user prompt. The fabricated conversation history (or example set) can be selected by a user, for example, from a plurality of stored fabricated conversation histories (or example sets) labelled according to semantic feature and defined states. In some applications, the fabricated history may be selected and retrieved by a chat application or language generation module, as described further herein, based on the content of the user prompt or information provided by the user.

The fabricated conversation history can be manually input by a user interacting with the language model API. In some applications, a fabricated conversation history can be retrieved, for example, by a language generation module in communication with a user device. In some applications, a fabricated conversation history can be retrieved in response to a user prompt provided to a chat application and referencing a semantic feature of interest associated with a fabricated conversation history.

In addition to the fabricated history, instructions can be provided to the language model for generating a response. Instructions for generating a response can be input as content assigned to the system in the API. Content can include, for example, a format in which responses are to be provided by the language model. For example, the user may specifically instruct the language model to "answer with the document title, a simple "yes" or "no" answer to the query, and an excerpt of support." Content can additionally include context to guide the language model to generate relevant responses. For example, content can include a role or behavior the user would like the language model to assume in generating the response. User-specific system prompts increase the likelihood that the machine-generated natural language is relevant to the user. Continuing with the example of contract review, the user can input content assigned to the system that includes, for example, the following context: "You are a legal assistant evaluating contracts for specific concerns. Answer with the document title . . . " The system prompt can be stored as part of the fabricated conversation history or subsequently stitched together with the fabrication conversation history in a pre-prompt provided to the language model.

In step 112, the fabricated conversation history, system prompt, and a user prompt are submitted to the language model to elicit a response to the user prompt from the language model. The user prompt can include a new example (e.g., document under review) and a question or instruction related to the new example. The question or instruction can be the same as the questions or instructions presented in the fabricated conversation history (i.e., first and second questions or instructions assigned to the user in the example above). The fabricated conversation history is submitted with the user prompt such that the user prompt is treated by the language model as a continuation of an interaction with the user (i.e., the language model is influenced by what it recognizes as responses the language model provided to previous user prompts). The fabricated conversation history is submitted to the language model. As previously discussed, there can be a restriction on the number of tokens the language model can process in a single interaction. The combination of the fabricated conversation history provided in step 108 or selected in step 110 and the user prompt to elicit a response from the language model is considered a single interaction. In examples where a token limit is enforced by the language model, as much of the fabricated conversation history will be submitted to the language model as can be within the token limitation to generate a new response to the user prompt. If the token limit is exceeded, a portion of the fabricated conversation history will not be submitted to the language model and, therefore, will not influence the generated response to the user prompt.

In examples where a token limit is enforced by the language model, the size (e.g., word count) of the user prompt is restricted to ensure that the entirety of the fabricated conversation history is submitted to the language model to influence the response generated by the language model. A user can break down a document under review into smaller segments of text as was discussed with respect to generating the example set from documents that exceed the token limit of the language model. It is not necessary that the segments contain information relevant to the semantic feature of interest.

Step 112 can be conducted multiple times with different examples or segments of text extracted from a document under review. Each iteration (step 116) is input as a new interaction with the language model. Only the fabricated conversation history (and system prompt) is retained in the new interaction. For example, each interaction includes the fabricated conversation history (inputs 1-4 in the example above) followed by the user prompt, the content of which includes a new example, such as additional text from the document under review or text from new document under review, and a question or instruction relating to the additional or new document text. Again, the question or instruction provided in the user prompt can be the same as the question or instruction provided throughout the fabricated conversation history. The question or instruction provided in the user prompt can remain the same through multiple interactions.

A user can input the user prompt with the fabricated conversation history in the API. In some applications, a user may input the user prompt alone via a user interface of a chat application on a user device and the chat application or other system component can package the user prompt with the corresponding fabricated conversation history for transmission to the language model.

The language model receives the fabricated conversation history, user prompt, and optional system prompt and generates a response to the user prompt. In step 114, the generated response can be received and reviewed to determine if the document can be classified according to state. The model-generated response can be presented as content assigned to the assistant in the API. The user may determine that it is necessary to present additional examples or segments of text to evaluate a larger portion or entirety of the document. In this case, as shown in step 116, the user can initiate a new interaction with the language model that includes the fabricated conversation history followed by a new user prompt including a different segment of text to elicit a new response from the language model. This process can be repeated until all desired segments of the document have been presented. For example, in a first iteration, the new user prompt can include a first segment of text from a document; in a second iteration, the new user prompt can include a second segment of text from the document; in a third iteration, the new user prompt can include a third segment of text from the document; and so on until all segments of the document or all segments of interest have been evaluated or until the language model returns, for example, a positive response or response indicating that the semantic feature of interest is present in the example provided in the new user prompt. Importantly, the new user prompt and language model response to the new user prompt are not retained in subsequent interactions and, therefore, do not influence the language model in the generation of subsequent responses to new user prompts containing new examples. Step 116 can be user-initiated and executed. In some examples, step 116 may be automated to examine multiple segments of a document or multiple documents.

Continuing with the example of contract review, a user can input a user prompt to follow the fabricated conversation history. The user prompt includes one or more segments of text from a contract under review and a question related to the contract. The question is the same question asked as part of the user prompts in the fabricated conversation history (e.g., "Does this contract prevent any party from using people or systems outside of the United States or place restrictions . . . ?"). The contract under review is different from the first and second contracts used to generate the example set in the fabricated conversation history. The contract under review can be broken down into segments that can be accommodated by a token limit of the language model. The contract may or may not be broken down by content. In some examples, the contract may be broken into segments according to delineated sections of the contract. In other examples, the contract may be broken into segments according to size (e.g., character or word count). The user can electronically input one or more segments of text into the user prompt. In some applications, the segments of the document can be stored in a local or remote data source accessible to the user and/or a system for retrieval and auto-populating user prompts.

In a first interaction with the language model, the user inputs a prompt assigned to the user role that includes a first segment of text from the document and the question relating to the text. The language model provides a response (e.g., "yes" or "no"), which is provided to the user (e.g., presented as content assigned to the assistant in the API). If the response is positive (simple answer is "yes"), the inquiry may cease. If the response is negative (simple answer is "no"), the user may repeat the process with a new segment of text from the document. In doing so, the user begins a new interaction with the language model, discarding the previous user prompt and language model response but retaining or reusing the fabricated conversation history. This process can be repeated until the positive response is returned or until the user is satisfied that the segments of the document that have been reviewed amount to a sufficiently thorough review of the document. In some examples, the language model may be instructed (i.e., via the system prompt) to provide an excerpt from the document supporting the simple response provided. In such case, a negative response (simple answer "no") followed by support indicating that the contract language explicitly allows cross-border communication or participation, for example, could end the inquiry and the process can be ceased.

Step 112 (and, optionally, step 116) can be repeated to evaluate multiple documents under review. Advantageously, use of method 100 can significantly reduce the time required for manual review of documents. The fabricated conversation history conditions the language model to reduce hallucinations and influence or guide the model to produce improved accuracy in responses. Method 100 has been demonstrated to extract semantic features of interest efficiently and reliably from multiple documents under review. Method 100 has been demonstrated to be particularly useful in review of contracts, which can contain complex terminology or language that requires evaluation by individuals with specialized training or knowledge. Use of method 100 with a generalized language model is not intended to fully replace manual review when accuracy is paramount. It will be understood by one of ordinary skill in the art that the accuracy of results (i.e., response generated by the language model) is dependent on the strength (e.g. illustrativeness and labelling accuracy) of the example set. Because the example set is often limited based on token restrictions of the language model, it can be expected that method 100 may yield results that are overinclusive or underinclusive. As discussed further herein, it is important to test the fabricated conversation history with vetted or manually reviewed documents to ensure that the example set yields satisfactory results.

Notably, use of the fabricated conversation history has been demonstrated to produce more accurate and reliable results than providing the same examples identified by category in a single user prompt as typically done in natural language chat applications. In the contract review example discussed above, an example set including one positive example (indicating the semantic feature of interest is present) and one negative example (indicating the semantic feature of interest is absent) was produced by manually analyzing a subset of documents under review. The positive example was generated by culling, from a single document, one or more small excerpts containing language directed to the semantic feature of interest (in this case, cross-border restrictions). The negative example was generated by reproducing most of the structure of a separate document in condensed form and not including language indicating the semantic feature of interest is present. In one investigation, the example set was input as a single user prompt, which identified the examples as being positive or negative, followed by text from a new document and a question addressed to the language model pertaining to the new document. In a second investigation, the example set was provided to the language model as a fabricated conversation history in accordance to method 100. In a third investigation, only text from the new document under review was provided to the language model along with the question pertaining to the new document. In this case, no examples were provided to the language model. All three investigation methods—(1) single prompt without examples, (2) single prompt with the example set, and (3) fabricated conversation history—were used to analyze multiple documents under review. All documents under review were also manually reviewed to determine accuracy of the language model. Analysis considered (1) the overall number of documents identified as containing the semantic feature of interest (positive results), (2) the number of positive results identified by the language model but not identified by manual review, and (3) the number of positive results that manual review identified that were not identified or missed by the language model.

As provided in Table 1 below, marginal differences in results were observed in each of the three categories for the single prompt methods (with and without the example set). Investigation using the fabricated conversation (method 100) approach improved the language model "miss" results considerably while only marginally increasing the number of false positives. In some instances, secondary manual review of the documents identified by the language model as including the semantic feature of interest confirmed that the language model analysis was in fact correct and that the initial manual review was incorrect.

TABLE 1

Results of document review using method 100 compared to other methods of interacting with a language model

| | Single prompt, no examples | Single prompt, with examples | Fabricated conversation history |
|---|---|---|---|
| LLM Overall Results - semantic feature found | 23 | 19 | 28 |
| LLM found, manual review did not* | 10 | 8 | 12 |
| Manual review found, LLM missed | 7 | 9 | 3 |

*post review of a small number of documents revealed some of the documents were misses during the manual review process.

As previously noted, method 100 can include an application phase as described in steps 102-116 and a testing phase 120. In the testing phase, multiple documents that have been manually reviewed can be evaluated in steps 112 and 114 to determine the strength of the example set. If the results are unacceptable (i.e., do not sufficiently match the results of the manual review), the example set can be adjusted. For example, in a fabricated conversation history that includes two examples, one or both examples can be replaced with new examples. This may include replacing a segment of text from a document with a different segment of text from the same document or may include replacing a segment of text from one document with a segment of text from another document. Generally, the example set should include text that is relevant to the query. It is not necessary that the language used to express the semantic feature of interest be substantially similar to the language used in the documents under review although this may be a consideration in the testing phase. Once acceptable results are achieved, steps 112 and 114 can be performed with fabricated conversation history developed in the testing phase to evaluate new documents.

Figure 2:
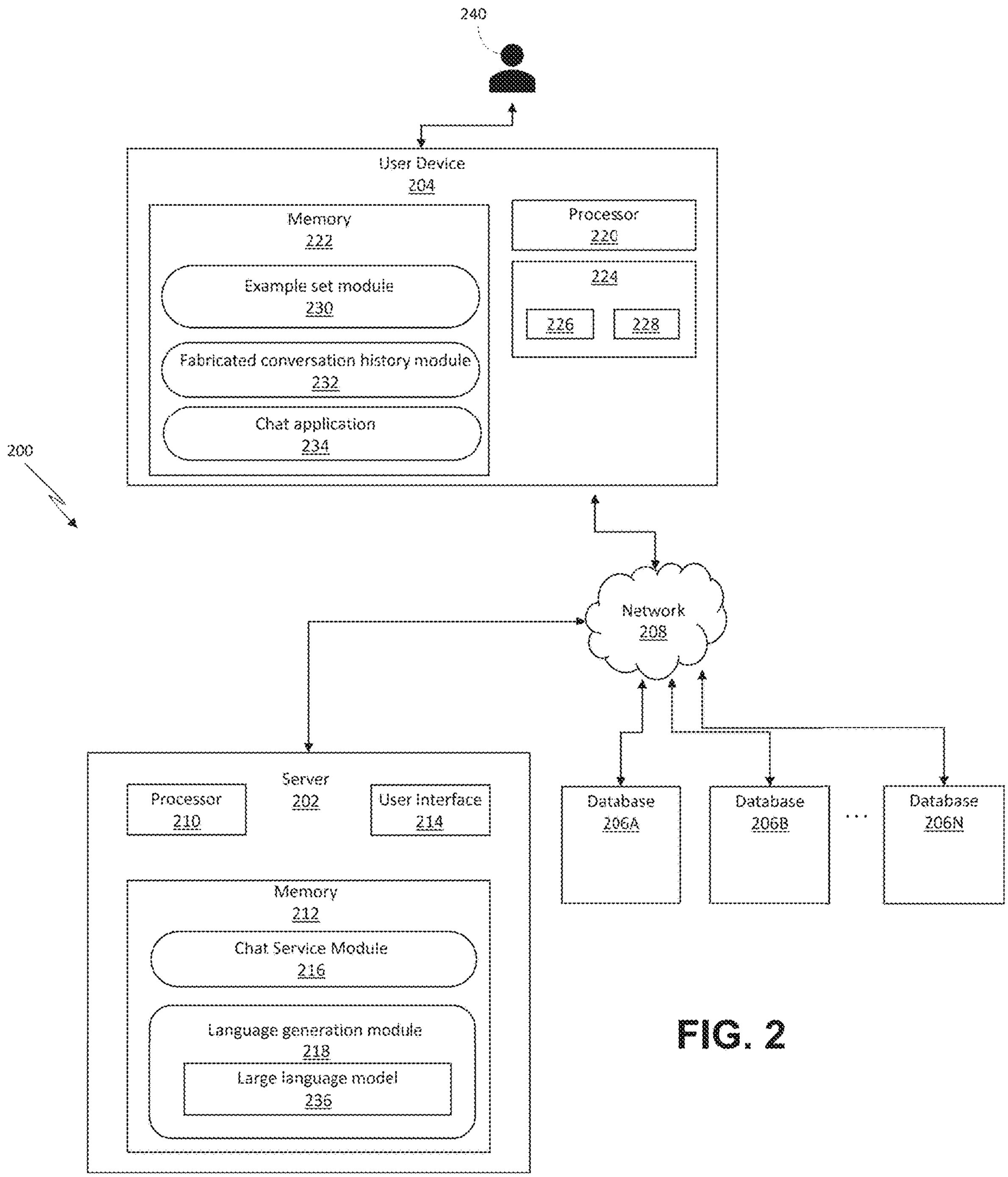
FIG. 2 is a schematic diagram of an example of a system for generating natural-language responses to user-generated prompts.

FIG. 2 is a schematic depiction of system 200, which is a system for generating natural-language responses to user-generated prompts. System 200 is suitable for use with method 100. System 200 includes server 202, user device 204, databases 206A-N, and network 208. Server 202 includes processor 210, memory 212, and user interface 214. Memory 212 stores chat service module 216 and language generation module 218. User device 204 includes processor 220, memory 222, and user interface 224. User interface 224 optionally includes both input device 226 and output device 228. Memory 222 can include example set module 230, fabricated conversation history module 232, and chat application 234. Language generation module 218 of server 202 includes language model 236.

System 200 operates a chat service that uses a machine-learning language model to generate natural-language responses to user-generated prompts. As previously described, the natural-language responses generated by server 202 are based in part on example sets and/or fabricated conversation histories stored to user device 204 and/or one or more databases 206A-N. As previously described, example sets are used to generate fabricated conversation histories, which are used as pre-prompts or context to influence the language model's response to subsequent user-generated prompts. The fabricated conversation histories increase the accuracy of responses generated by the language model and reduce hallucinations created by the language model.

Server 202 is connected to network 208 via one or more wired and/or wireless connections and is able to communicate with user device 204 via network 188. In some examples, server 202 can be referred to as a "remote device" and/or a "remotely connected device." Although server 202 is generally referred to herein as a server, server 202 can be any suitable network-connectable computing device for performing the functions of server 202 detailed herein.

Processor 210 can execute software, applications, and/or programs stored on memory 212. Examples of processor 210 can include one or more of a processor, a microprocessor, a controller, a digital signal processor (DSP), an application specific integrated circuit (ASIC), a field-programmable gate array (FPGA), or other equivalent discrete or integrated logic circuitry. Processor 210 can be entirely or partially mounted on one or more circuit boards.

Memory 212 is configured to store information and, in some examples, can be described as a computer-readable storage medium. Memory 212, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 212 is a temporary memory. As used herein, a temporary memory refers to a memory having a primary purpose that is not long-term storage. Memory 212, in some examples, is described as volatile memory. As used herein, a volatile memory refers to a memory that that the memory does not maintain stored contents when power to the memory 212 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on server 202 (e.g., by a computer-implemented machine-learning model) to temporarily store information during program execution.

Memory 212, in some examples, also includes one or more computer-readable storage media. Memory 212 can be configured to store larger amounts of information than volatile memory. Memory 212 can further be configured for long-term storage of information. In some examples, memory 212 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 214 is an input and/or output device and/or software interface and enables an operator to control operation of and/or interact with software elements of server 202. For example, user interface 214 can be configured to receive inputs from an operator and/or provide outputs. User interface 214 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

User device 204 is an electronic device that a user (e.g., user 240) can use to access network 208 and functionality of server 202 (i.e., via network 208). User device 204 includes processor 220, memory 222, and user interface 224, which are substantially similar to processor 210, memory 212, and user interface 214, respectively, and the discussion herein of processor 210, memory 212, and user interface 214 is applicable to processor 220, memory 222, and user interface 224, respectively. User device 204 includes networking capability for sending and receiving data transmissions via network 208 and can be, for example, a personal computer or any other suitable electronic device for performing the functions of user device 204 detailed herein. Memory 222 stores software elements of chat application 234, example set module 230 and fabricated conversation history module 232.

User interface 224 optionally includes one or both input device 226 and output device 228. Input device 226 is a device that a user (e.g., user 240) can use to provide inputs to the program(s) of user device 204. Input device 226 can be, for example, a touchscreen, a keyboard, a mouse, a joystick, etc. A user can use input device 226, for example, to provide inputs to chat application 234, example set module 230, and fabricated conversation history module 232. Output device 228 is a device for communicating outputs from the program(s) of user device 204 to a user (e.g., user 240). Output device 238 can include, for example, one or more of a display, a speaker, or any other suitable device for conveying outputs from the program(s) of user device 204.

Databases 206A-N are electronic databases that are directly connected to server 202 and/or are connected to server 202 via a local network 208. Each of databases 206A-N includes machine-readable data storage capable of retrievably housing stored data, such as database or application data. In some examples, one or more of databases 206A-N includes long-term non-volatile storage media, such as magnetic hard discs, optical discs, flash memories and other forms of solid-state memory, or forms of electrically programmable memories (EPROM) or electrically erasable and programmable (EEPROM) memories. Databases 206A-N organize data using DBMSs, and each of databases 206A-N can include a processor, at least one memory, and a user interface that are substantially similar to processor 210, memory 212, and user interface 214 of server 202. In at least some examples, one or more of databases 206A-N are relational databases. Each of databases 206A-N can be a structured database (e.g., a table or relational database) or a semi-structured database (e.g., a hierarchical and/or nested database). Databases 206A-N can store examples labelled according to state in step 104 of method 100, example sets generated in step 106, and fabricated conversation histories generated in step 108.

Network 208 is a network suitable for connecting and facilitating network communication between server 202, user device 204, and databases 206A-N. Network 208 can include any suitable combination of local network and wide area network (WAN) elements or components to connect server 202, user device 204, and databases 206A-N. In some examples, the wide area network can be or include the Internet. For example, server 202 can be connected to databases 206A-N via a local network and server 202 can be connected to user device 204 via a WAN. As a further example, server 202 can be connected to all of user device 204 and databases 206A-N via a WAN. In yet further examples, server 202 can be connected to some of databases 206A-N via a WAN and others of databases 206A-N and/or vector database via a local network.

Chat service module 216 is a software module of server 202 and includes one or more programs for running a chat service. The chat service operated by chat service module 216 is accessible by chat application 234 and enables users to receive machine-generated natural-language text replies to user-generated text prompts. Chat service module 216 runs services used and/or invoked by chat application 234 and in operation provides user-generated prompts to language generation module 218, and further provides natural-language text replies generated by the program(s) of language generation module 218 to user device 204. Natural-language text replies generated by server 202 and transmitted to user device 204 in this manner can be communicated to a user via chat application 234.

Language generation module 218 is a software module of server 202 and includes one or more programs for automated natural-language text generation. Language generation module includes machine-learning language model 236 trained to generate natural-language outputs (or tokenized representations thereof) from natural-language inputs (or tokenized representations thereof). In some examples, language generation module 218 can include one or more programs for converting natural-language inputs into numeric representations and for converting numeric representations of text information into natural-language text. For example, language generation module 218 can include a tokenization algorithm for generating tokens representative of text (e.g., encoding user inputs) and for generating natural-language text based on token information (e.g., decoding machine-generated tokens). Language model 236 can be a language model such as, for example, a large language model and/or a transformer model.

Chat application 234 is a software application of user device 204 for receiving user prompts and fabricated conversation histories, providing those prompts and fabrication histories to server 202, receiving responses from server 202, and communicating those responses to the user (e.g., user 240). Chat application 234 can be, in some examples, a web browser for accessing a web application hosted by server 202 that uses the functionality of chat service module 216. Chat application 234 can be an API, allowing programmatic access to language generation module 218. Additionally, and/or alternatively, chat application 234 can be a specialized software application for interacting with chat service module 216 of server 202.

Example set module 230 and fabricated conversation history module 232 are software applications that can be included in user device 203 for managing examples, example sets, and fabricated conversation histories. Example set module 230 and fabricated conversation history module 232 can manage and store examples and/or example sets and fabricated conversation histories for use in chat application 234. Each example, example set, and fabricated conversation history can be tagged with a unique identifier for retrieval. Examples, example sets, and fabricated conversation histories can be organized according to state and/or semantic feature of interest. A user can interact with software of example set module 230 and fabricated conversation history module 232 to generate and modify examples and/or example sets and fabricated conversation histories.

In some applications, example set module 230 and fabricated conversation history module 232 can provide examples and/or example sets and fabricated conversation histories to server 202 and server 202 can store those examples and/or example sets and fabricated conversation histories to one or more databases 206A-N. Server 202 can retrieve user-selected example sets or fabricated conversation histories for use with chat application 234. Unique fabricated conversation histories and example sets can be labelled and stored according to semantic feature and defined states for retrieval and use with a related user prompt. In some applications, example sets and/or fabricated conversation histories can be queried based on a semantic feature referenced in a user prompt to identify and retrieve an example set or fabricated conversation history relating to the semantic feature.

In operation, a user in step 112 of method 100 can provide a prompt to chat application 234 via input device 226. In addition to the user prompt, the user can provide to chat application 234, a fabricated conversation history generated in step 108 relevant to the user prompt. The user can additionally provide to chat application 234 a system prompt providing instructions for language model 246 for generating a response. The fabricated conversation history can be manually entered by the user with examples retrieved from example set module 230 or databases 206A-N or as a complete fabricated conversation history retrieved from fabricated conversation history module 232 or databases 206A-N. In some applications, chat application 234 can be configured to retrieve or receive a fabricated conversation history from fabricated conversation history module 232 in response to the user prompt or instructions provided by the user.

The user prompt, fabricated conversation history, and system prompt can be stitched together in chat application 234 and transmitted as a prepackaged prompt to chat service module 216 of server 202 via network 208 and user interface 214. The user prompt, fabricated conversation history, and system prompt are natural-language text. The prepackaged prompt can be received by language generation module 218 via chat service module 216. Language generation module 218 generates a natural language response to the user prompt via language model 236. Chat service module 116 provides the language output by language generation module 218 to chat application 234. Chat application 234 can communicate the language output to the user as a response to the user's original natural-language prompt.

Figure 3:
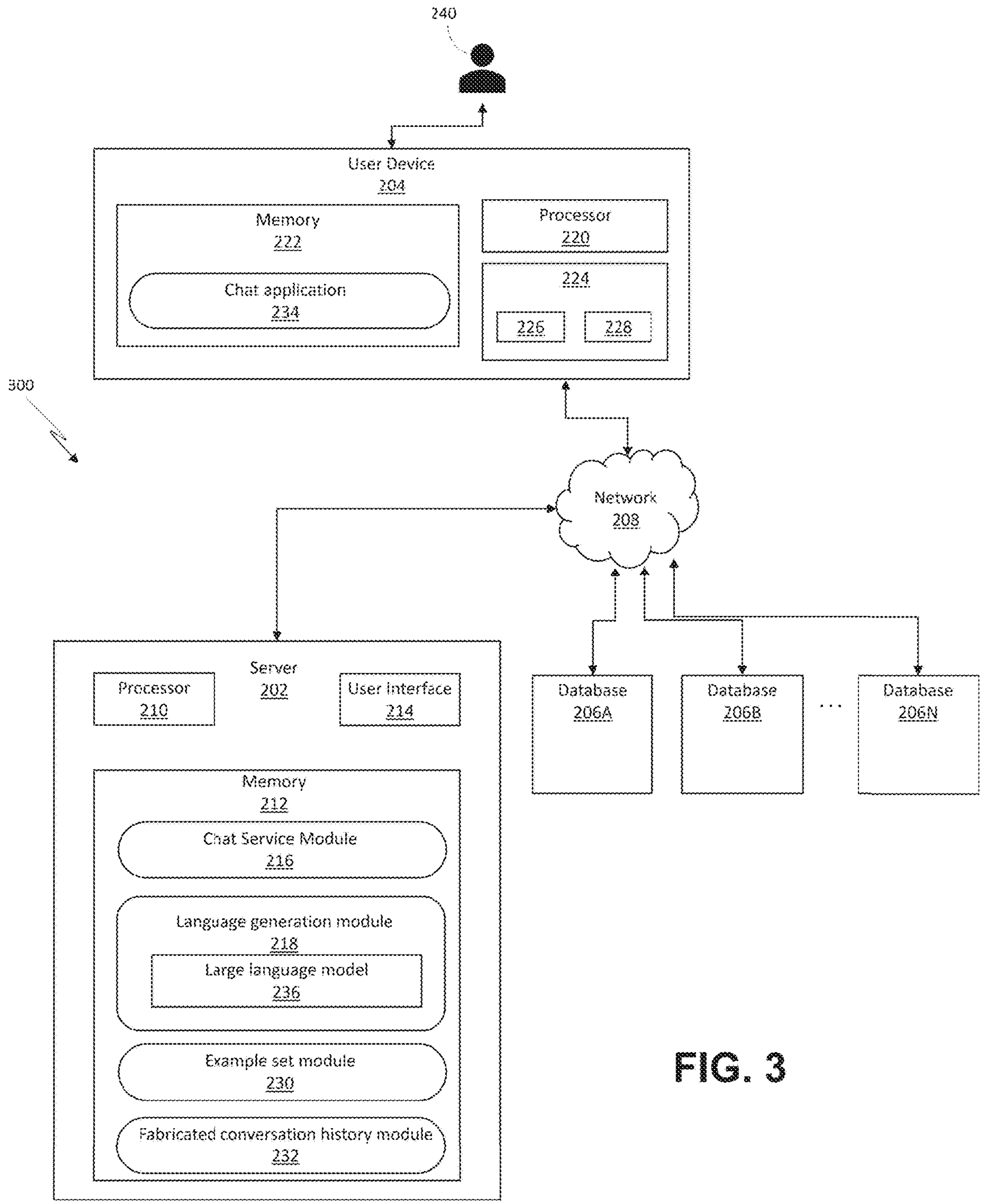
FIG. 3 is a schematic diagram of another example of a system for generating natural-language responses to user-generated prompts.

FIG. 3 is a schematic depiction of system 300. System 300 is another example of a system for generating natural-language responses to user-generated prompts and suitable for use with method 100. System 300 is substantially similar to system 200 with the exception that example set module 230 and fabricated conversation history module 232 reside on server 202. In this configuration, language generation module 218 can stitch together a user prompt received from chat application 234 of user device 204 and a fabricated conversation history retrieved from fabricated conversation module 232. In some examples, language generation module 218 may be configured to query example sets or fabricated conversation histories stored in example set module 230 and fabricated conversation history module 232, respectively, or in one or more databases 206A-N accessible to server 202 based on the content of the user prompt or other user-provided instruction. Language generation module 218 can retrieve or generate a fabricated conversation history relevant to the user prompt or user-provided instruction.

Figure 4:
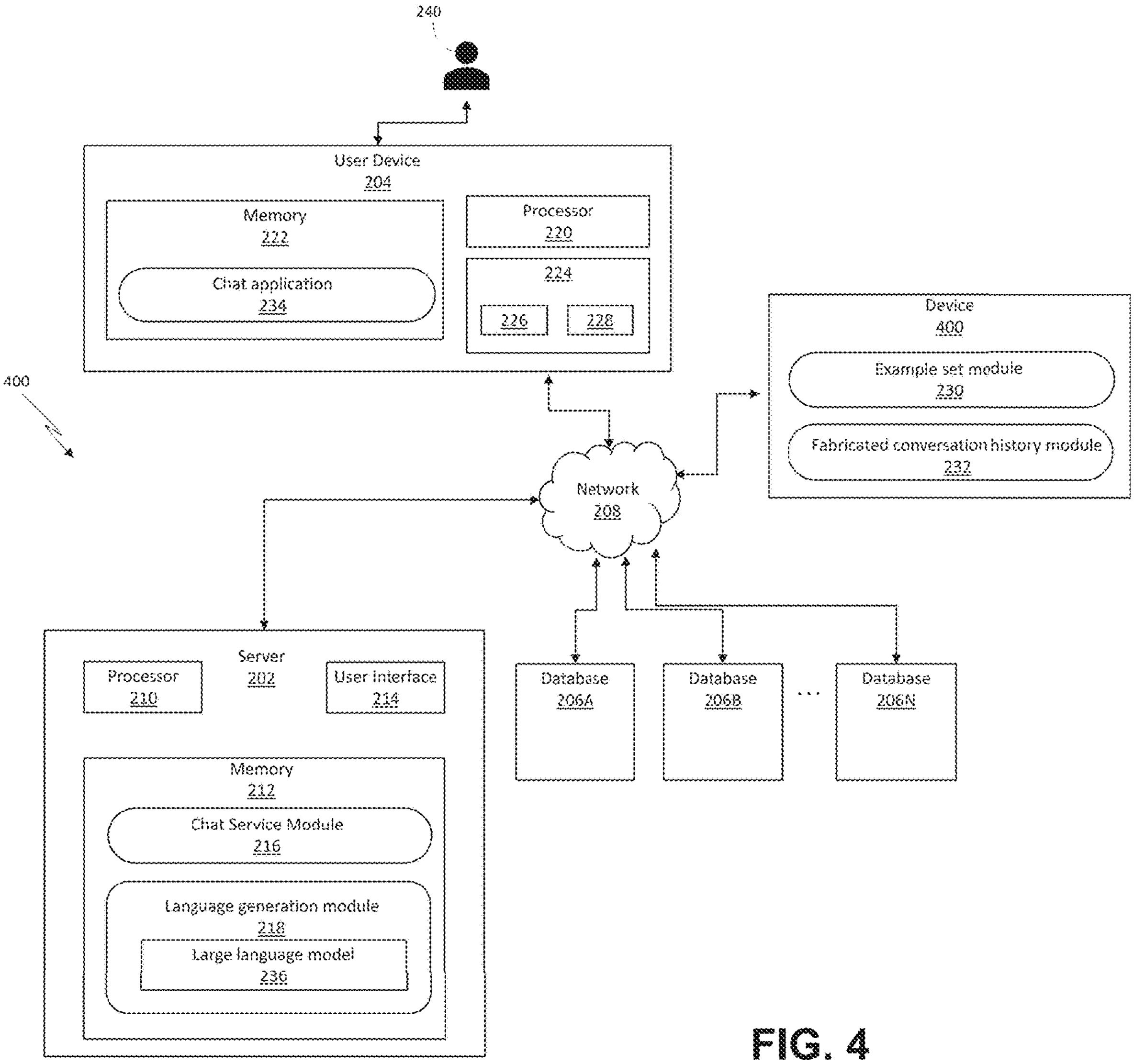
FIG. 4 is a schematic diagram of yet another example of a system for generating natural-language responses to user-generated prompts.

FIG. 4 is a schematic depiction of system 400. System 400 is yet another example of a system for generating natural-language responses to user-generated prompts and suitable for use with method 400. System 400 is substantially similar to systems 200 and 300 with the exception that example set module 230 and fabricated conversation history module 232 reside on remote device 400. Remote device 400 can be any type of storage device analogous to databases 206A-N. Remote device 400 can be accessible to user 240 on user device 204 via network 208 and can be accessible to server 202 via network 208. In this configuration, the user prompt can be stitched together with a corresponding fabricated conversation history in chat application 234 or, alternatively, language generation module 218.

While systems 200, 300, and 400 are all capable of performing method 100, it will be understood that method 100 can be performed in any suitable system and can be adapted for a wide variety of language models.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A method of interacting with a large language model to elicit a semantic feature of interest from a document under review includes electronically inputting, in an application program interface of a chat application, a first prompt assigned to a user, the first prompt yielding a plurality of possible responses from the language model based on content of the document under review; generating an example set comprising text from example documents representative of each of the plurality of possible responses; and electronically inputting, before the first prompt in an application program interface of a chat application, a fabricated history of a conversation between the user and the language model. The fabricated history includes the example set and a plurality of possible responses assigned to the language model.

The method of the preceding paragraph can optionally include, additionally and/or alternatively, any one or more of the following features, configurations, additional components, and/or steps:

In an embodiment of the method of the preceding paragraphs, the first prompt can include text from the document under review and a first query directed to identifying the semantic feature of interest in the document under review.

In an embodiment of the method of any of the preceding paragraphs, the fabricated history can include a plurality of prompts assigned to the user with each prompt assigned to the user including text from one of the example documents and the first query directed to identifying the semantic feature in the one of the example documents. Each prompt assigned to the user can be followed by a corresponding one of the plurality of possible responses assigned to the language model.

In an embodiment of the method of any of the preceding paragraphs, the example documents used to generate the example set can be different and are different from the document under review.

In an embodiment of the method of any of the preceding paragraphs, the plurality of possible responses can include: a positive response, indicating the semantic feature of interest is contained in the text from the corresponding example document; and a negative response, indicating the semantic feature of interest is not contained in the text from the corresponding example document.

In an embodiment of the method of any of the preceding paragraphs, the documents can be legal contracts.

In an embodiment of the method of any of the preceding paragraphs, the semantic feature of interest can be a term or condition of the legal contracts.

In an embodiment of the method of any of the preceding paragraphs, at least one of the example set and the fabricated history can be stored in a database accessible by the chat application.

An embodiment of the method of any of the preceding paragraphs can further include repeating the step of electronically inputting the first prompt assigned to a user, creating a new first prompt assigned to the user with new text from one of the document under review and a new document under review. The first prompt can be replaced by the new first prompt and the new first prompt follows the fabricated history.

In another aspect, a method of interacting with a large language model to extract a semantic feature of interest from a document includes transmitting, to the language model, a fabricated history of a conversation between a user and the language model. The fabricated history includes a first prompt assigned to a user, content of the first prompt comprising text from a first document and a first query directed to identifying the semantic feature of interest in the first document; a first response assigned to the language model, content of the first response responsive to the first query; a second prompt assigned to the user, content of the second prompt comprising text from a second document and a second query directed to identifying the semantic feature of interest in the second document; and a second response assigned to the language model, content of the second response responsive to the second query. The first and second queries are the same and the content of the first response differs from content of the second response. The method also includes transmitting, to the language model, a third prompt assigned to the user, and receiving, from the language model, a third response to the third query. The content of the third prompt comprising includes text from a third document and a third query directed to identifying the semantic feature of interest in the third document. The third query is the same as the first and second queries.

The method of the preceding paragraph can optionally include, additionally and/or alternatively, any one or more of the following features, configurations, additional components, and/or steps:

In an embodiment of the preceding method, the first and second responses can represent all possible responses to the third query.

In an embodiment of the method of any of any of the preceding paragraphs, the fabricated history can include one or more additional prompts assigned to the user and one or more additional responses assigned to the language model, each of the one or more additional prompts assigned to the user comprising text from one of a plurality of documents and a query directed to identifying the semantic feature of interest in each of the plurality of documents. The first, second, and plurality of additional responses can represent all possible responses to the third query.

In an embodiment of the method of any of any of the preceding paragraphs, the first, second, and third documents can be different.

In an embodiment of the method of any of any of the preceding paragraphs, the first, second, and third documents can be legal contracts and the semantic feature of interest can be a condition of the legal contracts.

An embodiment of the method of any of any of the preceding paragraphs can further include transmitting a new third prompt assigned to the user with new text from the new third document. The third prompt can be replaced by the new third prompt and the new third prompt can follow the fabricated history.

In an embodiment of the method of any of any of the preceding paragraphs, all possible responses to the first and second queries can be positive, indicating that the corresponding first or second document contains the semantic feature of interest; and negative, indicating the corresponding first or second document does not contain the semantic feature of interest. One of the first and second responses is positive and the other of the first and second responses is negative.

An embodiment of the method of any of any of the preceding paragraphs can further include transmitting, to the language model, instructions defining a format for responses generated by the language model.

In an embodiment of the method of any of any of the preceding paragraphs, the first and second responses can be formatted according to the instructions assigned to the language model.

An embodiment of the method of any of any of the preceding paragraphs can further include querying a database to retrieve the fabricated history of a conversation, wherein the fabricated history is associated with the semantic feature of interest.

The invention claimed is:

1. A method of interacting with a large language model to improve accuracy of the large language model in extracting a semantic feature of interest from a document under review, the method comprising:

electronically inputting, in an application program interface of a chat application,
- a first prompt comprising:
  - a first query directed to identifying the semantic feature of interest in the document under review; and
  - text from the document under review;
  - wherein the first prompt is assigned to a user role in the application program interface; and
  - wherein the first prompt yields a plurality of possible responses from the language model based on content of the text of the document under review;

generating an example set comprising text from example documents representative of each of the plurality of possible responses;

electronically inputting, before the first prompt in the application program interface of the chat application, a fabricated history of a conversation between the user and the language model, the fabricated history comprising:
- the example set assigned to the user role in the application program interface; and
- a plurality of possible responses assigned to a language model role in the application program interface; and receiving, from the language model, a response to the first prompt, wherein the response is one of the plurality of possible responses.

2. The method of claim 1, wherein the fabricated history comprises:

a plurality of prompts assigned to the user role in the application program interface, each prompt assigned to the user role including text from one of the example documents and the first query directed to identifying the semantic feature in the one of the example documents;

wherein each prompt assigned to the user role is followed by a corresponding one of the plurality of possible responses assigned to the language model role in the application program interface.

3. The method of claim 2, wherein the example documents used to generate the example set are different and are different from the document under review.

4. The method of claim 1, wherein the plurality of possible responses include:

a positive response, indicating the semantic feature of interest is contained in the text from the corresponding example document; and a negative response, indicating the semantic feature of interest is not contained in the text from the corresponding example document.

5. The method of claim 1, wherein the documents are legal contracts.

6. The method of claim 5, wherein the semantic feature of interest is a term or condition of the legal contracts.

7. The method of claim 1, wherein at least one of the example set and the fabricated history is stored in a database accessible by the chat application.

8. The method of claim 1, and further comprising creating a new first prompt assigned to the user role in the application program interface, the new first prompt including new text from one of the document under review and a new document under review, wherein the first prompt is replaced by the new first prompt and wherein the new first prompt follows the fabricated history.

9. The method of claim 1, wherein the first prompt and the fabricated conversation history are user-generated and input into the application program interface, and wherein the response to the first prompt is generated by the language model.

10. A method of interacting with a large language model to improve accuracy of the large language model in extracting a semantic feature of interest from a document, the method comprising:

transmitting, to the language model, a fabricated history of a conversation between a user and the language model, the fabricated history comprising:

a first prompt assigned to a user role in an application program interface of a chat application, content of the first prompt comprising text from a first document and a first query directed to identifying the semantic feature of interest in the first document;

a first response assigned to language model role in the application program interface, content of the first response responsive to the first query;

a second prompt assigned to the user role in the application program interface, content of the second prompt comprising text from a second document and a second query directed to identifying the semantic feature of interest in the second document; and a second response assigned to the language model role in the application program interface, content of the second response responsive to the second query;

wherein the first and second queries are the same and wherein the content of the first response differs from content of the second response; and transmitting, to the language model, a third prompt assigned to the user role in the application program interface, content of the third prompt comprising text from a third document and a third query directed to identifying the semantic feature of interest in the third document, wherein the third query is the same as the first and second queries; and receiving, from the language model, a third response to the third query.

11. The method of claim 10, wherein the first and second responses represent all possible responses to the third query.

12. The method of claim 10, wherein the fabricated history includes one or more additional prompts assigned to the user role in the application program interface and one or more additional responses assigned to the language model role in the application program interface, each of the one or more additional prompts assigned to the user role comprising text from one of a plurality of documents and a query directed to identifying the semantic feature of interest in each of the plurality of documents, wherein the first, second, and plurality of additional responses represent all possible responses to the third query.

13. The method of claim 10, wherein the first, second, and third documents are different.

14. The method of claim 13, wherein the first, second, and third documents are legal contracts and wherein the semantic feature of interest is a condition of the legal contracts.

15. The method of claim 10 and further comprising transmitting a new third prompt assigned to the user role in the application program interface including new text from a new third document, wherein the third prompt is replaced by the new third prompt and wherein the new third prompt follows the fabricated history.

16. The method of claim 10, wherein all possible responses to the first and second queries are:

positive, indicating that the corresponding first or second document contains the semantic feature of interest; and negative, indicating the corresponding first or second document does not contain the semantic feature of interest;

wherein one of the first and second responses is positive and the other of the first and second responses is negative.

17. The method of claim 10, and further comprising transmitting, to the language model, instructions defining a format for responses generated by the language model, wherein the instructions are assigned to a system role in the application program interface.

18. The method of claim 17, wherein the first and second responses are formatted according to the instructions assigned to the system role in the application program interface.

19. The method of claim 10 and further comprising querying a database to retrieve the fabricated history of a conversation, wherein the fabricated history is stored in association with the semantic feature of interest.

20. The method of claim 10, wherein the first, second, and third prompts and the first and second responses are user-generated and input into the application program interface, and wherein the third response is generated by the language model.

* * * * *